(12) United States Patent
Deforge et al.

(10) Patent No.: US 12,739,757 B2
(45) **Date of Patent: *Sep. 15, 2026**

(54) DISTRIBUTED UNIT MONITORING OF RADIO UNIT TRANSMITTER PERFORMANCE

(71) Applicant: Dell Products L.P., Round Rock, TX (US)

(72) Inventors: John Bradley Deforge, Chelsea (CA); Mohammed Abdelsadek, Kanata (CA); Eran Goldstein, Montreal (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 282 days.

This patent is subject to a terminal disclaimer.

(21) Appl. No.: 18/432,204

(22) Filed: Feb. 5, 2024

(65) Prior Publication Data

US 2025/0254628 A1 Aug. 7, 2025

(51) Int. Cl.
*H04W 52/24* (2009.01)
*H04B 1/00* (2006.01)
*H04W 52/22* (2009.01)

(52) U.S. Cl.
CPC ....... *H04W 52/242* (2013.01); *H04W 52/225* (2013.01)

(58) Field of Classification Search
None
See application file for complete search history.

(56) References Cited

U.S. PATENT DOCUMENTS 5,983,085 A * 11/1999 Zamat ...................... H04B 1/04 455/127.1
7,082,108 B2 * 7/2006 Hwang ................ H04W 52/56 370/335

(Continued)

OTHER PUBLICATIONS

3GPP "3rd Generation Partnership Project; Technical Specification Group Radio Access Network; NR; Physical channels and modulation (Release 18)" 3GPP, 3GPP TS 38.211 V18.1.0 (Dec. 2023), 159 pages.

(Continued)

*Primary Examiner* — Tuan A Tran
(74) *Attorney, Agent, or Firm* — Amin, Turocy & Watson, LLP

(57) ABSTRACT

Distributed unit monitoring of radio unit transmitter performance (e.g., using a computerized tool), is enabled. For example, a system can comprise a processor and a memory that stores executable instructions that, when executed by the processor, facilitate performance of operations. The operations can comprise determining an average of differences between respective uplink path losses between a cellular node and a group of user equipment, and corresponding downlink path losses between the cellular node and the group of user equipment. The operations can further comprise, in response to the average of the differences between the respective uplink path losses and the corresponding downlink path losses being determined to satisfy a defined difference threshold, determining that the cellular node is not transmitting according to a specified power level.

20 Claims, 10 Drawing Sheets

(56) References Cited

U.S. PATENT DOCUMENTS 7,302,276 B2 * 11/2007 Bernhardsson ...... H04B 17/327 455/67.11
7,809,073 B2 * 10/2010 Liu ...................... H04B 1/7113 375/150
8,036,697 B2 * 10/2011 Asanuma ............ H04W 52/242 455/67.11
8,843,172 B2 * 9/2014 He ...................... H04W 52/146 455/69
8,897,231 B2 11/2014 Sawahashi et al.
8,929,227 B2 * 1/2015 Lee ..................... H04W 52/146 370/248
8,937,917 B2 * 1/2015 Jung ....................... H04L 5/001 455/450
8,989,655 B2 3/2015 Kang et al.
9,148,858 B2 * 9/2015 Park ...................... H04W 52/10
9,313,751 B2 * 4/2016 Englund ................ G06Q 10/06
9,374,802 B2 6/2016 Siomina et al.
9,642,114 B2 5/2017 Fong et al.
9,655,055 B2 * 5/2017 Morita ................ H04W 52/146
9,661,586 B2 * 5/2017 Gao ...................... H04W 52/04
9,781,685 B2 * 10/2017 Tsui .................... H04W 52/243
9,888,448 B2 * 2/2018 Panchal ................ H04W 72/21
9,961,683 B2 5/2018 Ali et al.
10,694,409 B2 * 6/2020 Ryu ...................... H04W 24/08
10,932,199 B2 * 2/2021 Li ....................... H04W 72/542
11,012,121 B2 * 5/2021 Fukui ................... H04B 7/0695
11,064,535 B2 * 7/2021 Huang .............. H04W 72/0453
11,129,039 B2 * 9/2021 Ryu ...................... H04W 24/08
11,134,514 B2 * 9/2021 Fei ...................... H04W 74/006
11,234,196 B2 * 1/2022 Ryu ...................... H04L 5/0048
11,343,776 B2 * 5/2022 Li ....................... H04W 52/146
11,483,843 B2 * 10/2022 Sun ...................... H04B 7/0626
11,502,794 B2 * 11/2022 Mochizuki .......... H04W 72/542
11,606,704 B2 * 3/2023 Ryu ...................... H04W 24/08
11,778,653 B2 * 10/2023 Sun ...................... H04B 17/309 370/329
11,910,213 B2 * 2/2024 Ryu ...................... H04L 5/0048
12,133,249 B2 * 10/2024 Sun ...................... H04B 17/309
12,160,380 B2 * 12/2024 Mochizuki .......... H04W 72/542
12,273,740 B2 * 4/2025 Yu ........................ H04B 7/0617
12,376,115 B2 * 7/2025 Qin ....................... H04L 5/0035
12,425,977 B2 * 9/2025 Jin ...................... H04W 52/146
2024/0040416 A1 2/2024 Hosseini et al.
2025/0063588 A1 2/2025 Kumar et al.
2025/0261123 A1 8/2025 Jang et al.

OTHER PUBLICATIONS

3GPP "3rd Generation Partnership Project; Technical Specification Group Radio Access Network; NR; Multiplexing and channel coding (Release 18) " 3GPP, 3GPP TS 38.212 V18.1.0 (Dec. 2023), 293 pages.

Non-Final Office Action received for U.S. Appl. No. 18/624,294 dated Mar. 12, 2026, 10 pages.

* cited by examiner

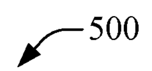
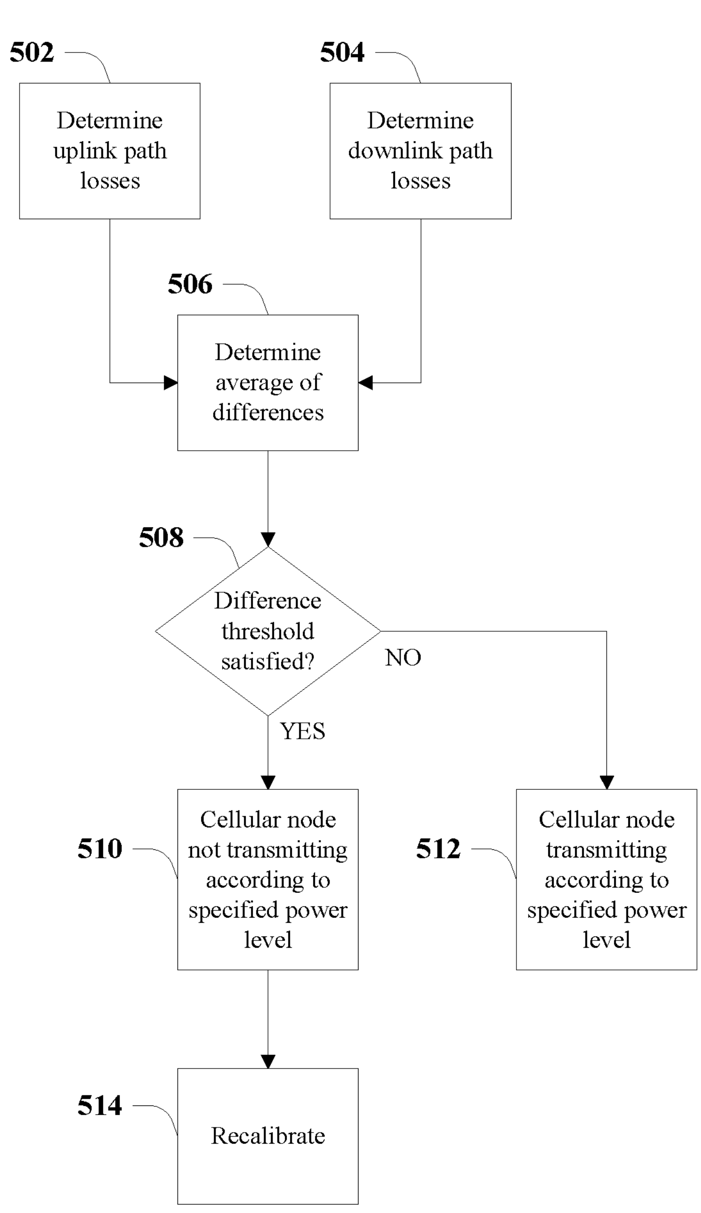
FIG. 5

Figure 7:
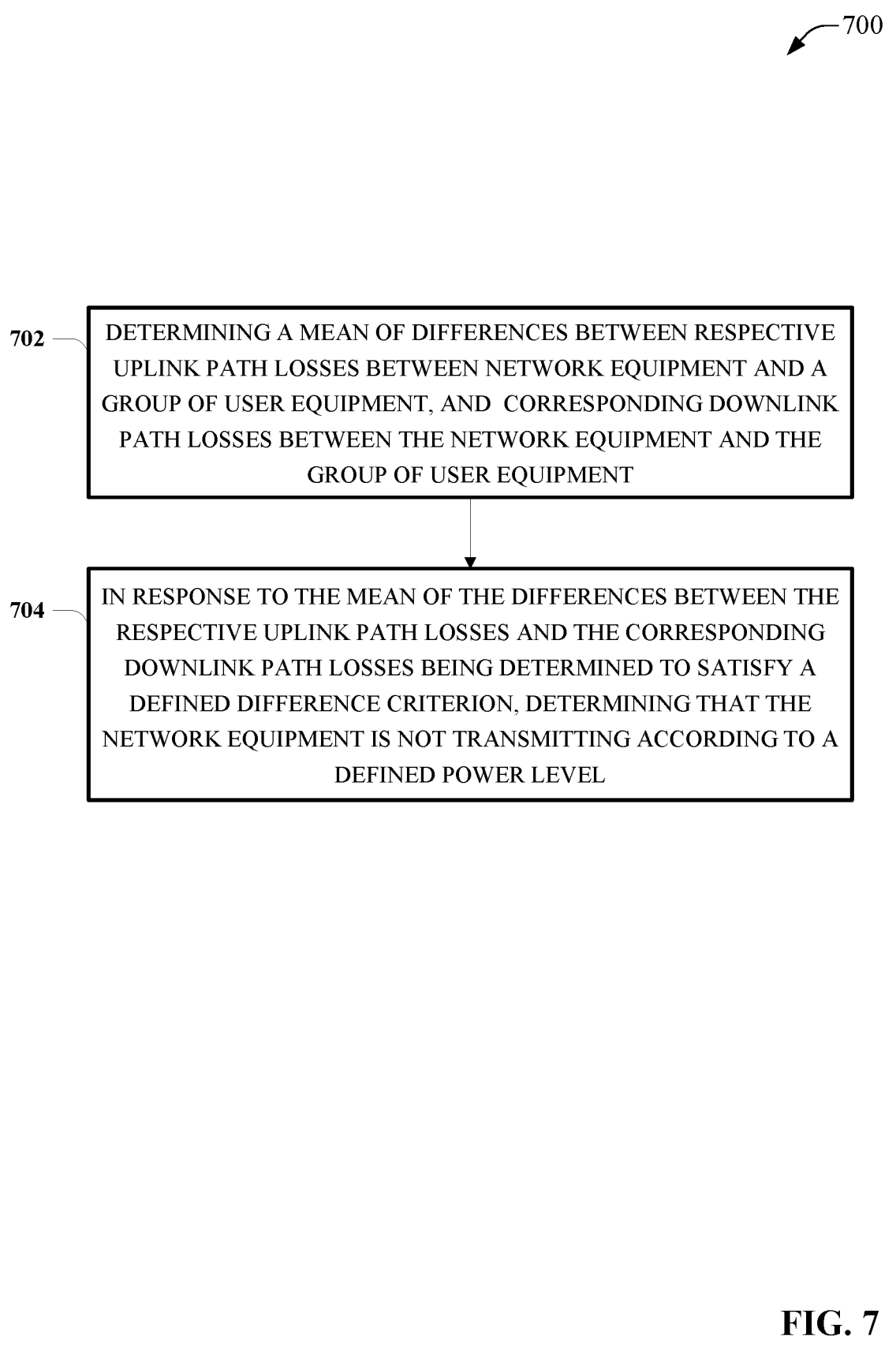

700

702 DETERMINING A MEAN OF DIFFERENCES BETWEEN RESPECTIVE UPLINK PATH LOSSES BETWEEN NETWORK EQUIPMENT AND A GROUP OF USER EQUIPMENT, AND CORRESPONDING DOWNLINK PATH LOSSES BETWEEN THE NETWORK EQUIPMENT AND THE GROUP OF USER EQUIPMENT

704 IN RESPONSE TO THE MEAN OF THE DIFFERENCES BETWEEN THE RESPECTIVE UPLINK PATH LOSSES AND THE CORRESPONDING DOWNLINK PATH LOSSES BEING DETERMINED TO SATISFY A DEFINED DIFFERENCE CRITERION, DETERMINING THAT THE NETWORK EQUIPMENT IS NOT TRANSMITTING ACCORDING TO A DEFINED POWER LEVEL

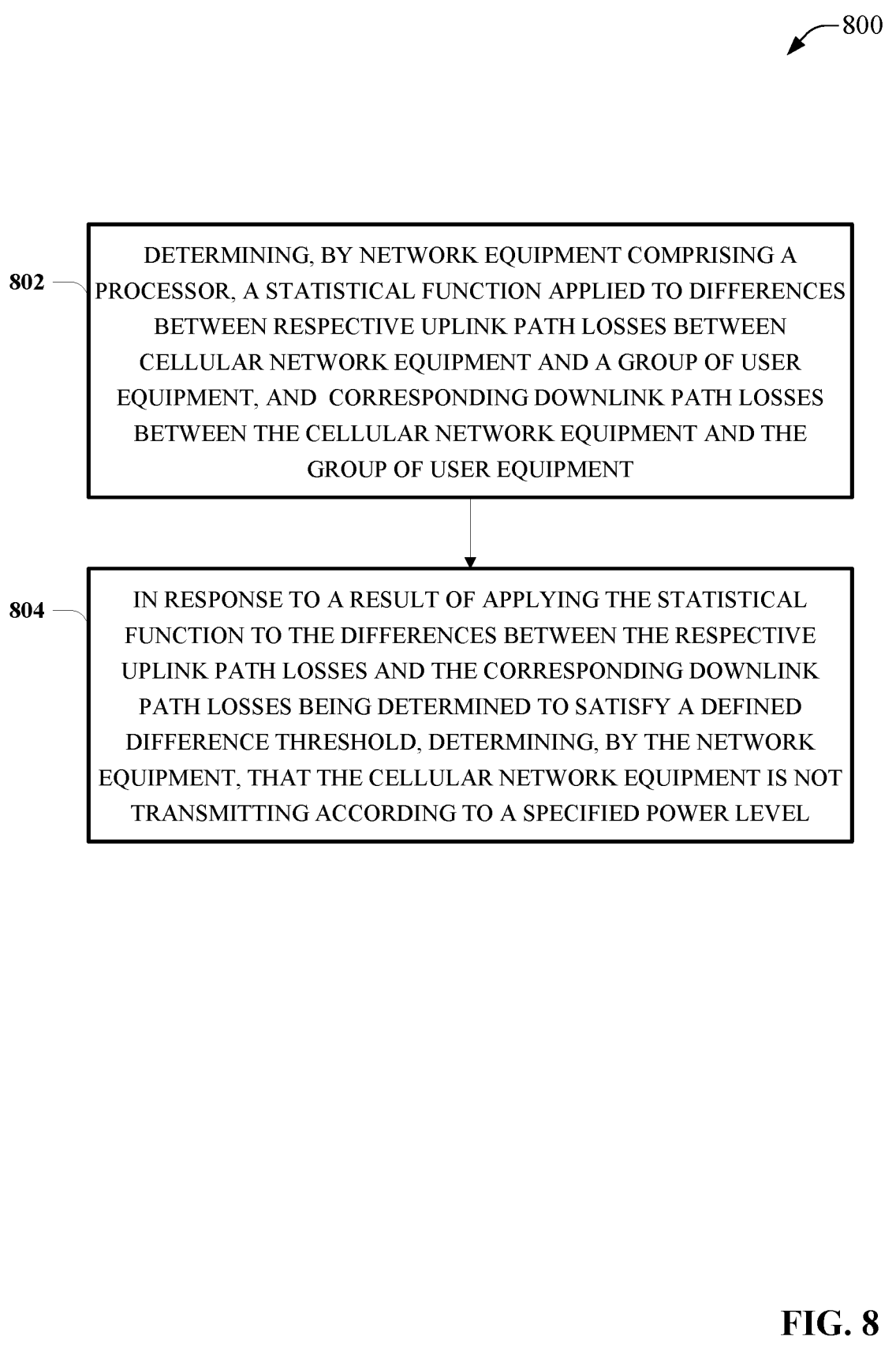

DETERMINING, BY NETWORK EQUIPMENT COMPRISING A PROCESSOR, A STATISTICAL FUNCTION APPLIED TO DIFFERENCES BETWEEN RESPECTIVE UPLINK PATH LOSSES BETWEEN CELLULAR NETWORK EQUIPMENT AND A GROUP OF USER EQUIPMENT, AND CORRESPONDING DOWNLINK PATH LOSSES BETWEEN THE CELLULAR NETWORK EQUIPMENT AND THE GROUP OF USER EQUIPMENT

804

IN RESPONSE TO A RESULT OF APPLYING THE STATISTICAL FUNCTION TO THE DIFFERENCES BETWEEN THE RESPECTIVE UPLINK PATH LOSSES AND THE CORRESPONDING DOWNLINK PATH LOSSES BEING DETERMINED TO SATISFY A DEFINED DIFFERENCE THRESHOLD, DETERMINING, BY THE NETWORK EQUIPMENT, THAT THE CELLULAR NETWORK EQUIPMENT IS NOT TRANSMITTING ACCORDING TO A SPECIFIED POWER LEVEL

FIG. 8

DISTRIBUTED UNIT MONITORING OF RADIO UNIT TRANSMITTER PERFORMANCE

BACKGROUND

In modern wireless networks, the radio unit (RU) is typically separated from the distributed unit (DU). Under the open radio access network (ORAN) framework, the RU and DU can originate from different manufacturers. Therefore, a given DU can be connected to different RUs with each RU having varying capabilities.

The transmitter chain of an RU can suffer from a soft degradation (e.g., reduced power, or increased power, as compared to intended transmission power), for instance, due to aging components, temperature, mechanical/electrical damage, or other reasons that may not necessarily prohibit the RU from functioning, but can still reduce the overall network performance.

The above-described background relating to ORAN is merely intended to provide a contextual overview of some current issues and is not intended to be exhaustive. Other contextual information may become further apparent upon review of the following detailed description.

BRIEF DESCRIPTION OF DRAWINGS

FIG. 5 is a flowchart for a process associated with distributed unit monitoring of radio unit transmitter performance in accordance with one or more example embodiments described herein.

FIG. 7 is a block flow diagram for a process associated with distributed unit monitoring of radio unit transmitter performance in accordance with one or more example embodiments described herein.

FIG. 8 is a block flow diagram for a process associated with distributed unit monitoring of radio unit transmitter performance in accordance with one or more example embodiments described herein.

DETAILED DESCRIPTION

Figure 1:
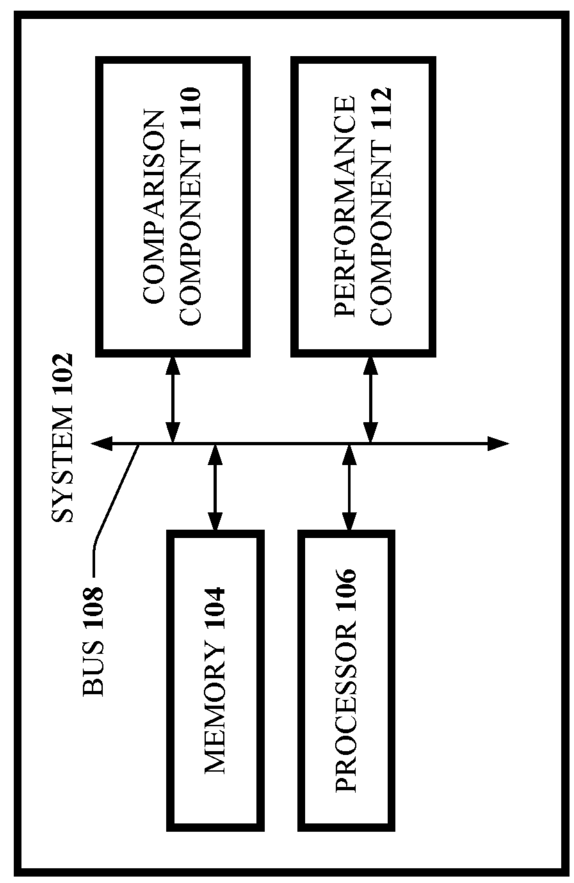
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, ORAN performance can be improved in various ways, and various embodiments are described herein to this end and/or other ends. The disclosed subject matter relates to ORAN performance and, more particularly, to distributed unit monitoring of radio unit transmitter performance.

A soft degradation in an RU transmitter can degrade the network performance, for instance, by reducing the cell range and demanding higher power levels from the user equipment (UE). Existing solutions require dedicated hardware for power amplifier (PA) automatic self-testing. Therefore, such solutions are more expensive, and can be faulty or inaccurate. Likewise, not all RUs support such reporting to the DU. Another approach is to measure PA power manually, which is also expensive. It is noted that, in various implementations, the RU can comprise the PA.

It is noted that RUs can originate from different providers, thus resulting in differing qualities and/or features. When connecting an RU to a DU, the quality of the integrated system needs to be determined, whether the RU is well-calibrated needs to be determined, and/or whether the RU properties (e.g., in this case, receiver saturation point) are as specified by the manufacturer needs to be determined. If some soft degradation occurs on the RU side, such soft degradation can be discovered, for instance, via indirect statistical data collected by the network (e.g., via a base station). However, this can take significant effort and time, and might be hidden, as the information is not direct. Some RUs can comprise on-the-field power measurement and log capability, however, those could still be faulty, and may not contain all components up to the antenna.

For various reasons, the calibrated RU (e.g., the whole system including the antennas) transmitted power could be impacted by heating, aging, mechanical damage, humidity, or other suitable factors. Such nonlimiting factors can impact the power in different transmitter (Tx) components, such as antenna, cables, connectors, PA, or other suitable components.

In various example embodiments herein, a network (e.g., via a base station or a gNodeB) can measure the path loss using two sources: (1) UE observed path loss, which is based on DL power; and (2) base-station observed path-loss, which is based on UL power. The network (e.g., via a system herein) can then compare these two measurements. A difference between the two measurements is indicative of a different DL power as compared to the broadcasted desired value. As the input signal may contain noise, values to utilize should have a high-enough signal to noise ratio (SNR) above the noise, in addition to applying standard noise and interference estimation techniques to reduce the impact on the signal power estimation. It is note that example embodiments herein are applicable to time division duplexing (TDD) networks in which reciprocity occurs over the same resource, and for frequency division duplexing (FDD) networks. A detected error can be forwarded (e.g., via a system herein) to an entity and/or handled locally to minimize impact until a fix is provided. In a more general sense, the network can benefit from additional metric data, which can be useful for predictive modeling relating to failures if, for example, the soft failure rate accelerates uncharacteristically (e.g., beyond a defined rate). Additionally, embodiments herein can be utilized in the manufacturing stages of various components herein, and for testing and validating base stations herein.

Embodiments herein can determine whether the transmitted power on an antenna port is lower (or higher) than intended. Such nonlimiting discrepancies can occur, for instance, due to temperature, aging, or mechanical damage of various transmitter components, such as antennas, cables, connectors, PAs, or other suitable components.

According to an example embodiment, a system can comprise a processor, and a memory that stores executable instructions that, when executed by the processor, facilitate performance of operations, comprising determining an average of differences between respective uplink path losses between a cellular node and a group of user equipment, and corresponding downlink path losses between the cellular node and the group of user equipment, and in response to the average of the differences between the respective uplink path losses and the corresponding downlink path losses being determined to satisfy a defined difference threshold, determining that the cellular node is not transmitting according to a specified power level.

In one or more example embodiments, the above operations can further comprise, in response to the determining that the cellular node is not transmitting according to the specified power level, recalibrating a transmission power level applicable to the cellular node. In this regard, recalibrating the transmission power level can comprise adjusting the transmission power level based on the average of the differences between the respective uplink path losses and the corresponding downlink path losses.

In one or more example embodiments, the cellular node can be part of a time division duplexing cellular network. In one or more example embodiments, the cellular node can be part of a frequency division duplexing cellular network.

In one or more example embodiments, respective uplink transmissions corresponding to the uplink path losses and corresponding downlink transmissions corresponding to the downlink path losses can utilize common resource blocks. In this regard, the common resource blocks can comprise common synchronization signal block channel(s) or common channel state information reference signal channel(s).

In another example embodiment, a non-transitory machine-readable medium can comprise executable instructions that, when executed by a processor, facilitate performance of operations, comprising determining a mean of differences between respective uplink path losses between network equipment and a group of user equipment, and corresponding downlink path losses between the network equipment and the group of user equipment, and in response to the mean of the differences between the respective uplink path losses and the corresponding downlink path losses being determined to satisfy a defined difference criterion, determining that the network equipment is not transmitting according to a defined power level.

In various embodiments, the above operations can further comprise, in response to the determining that the network equipment is not transmitting according to the defined power level, recalibrating a transmission power level applicable to the network equipment. In this regard, recalibrating the transmission power level can comprise adjusting the transmission power level based on the mean of the differences between the respective uplink path losses and the corresponding downlink path losses.

In one or more example embodiments, the network equipment can be part of a time division duplexing cellular network or a frequency division duplexing cellular network.

In one or more example embodiments, at least one of respective uplink transmissions corresponding to the uplink path losses or corresponding downlink transmissions corresponding to the downlink path losses can utilize common resource blocks. In this regard, the common resource blocks comprise common synchronization signal block channel(s) or common channel state information reference signal channel(s).

In yet another example embodiment, a method can comprise determining, by network equipment comprising a processor, a statistical function applied to differences between respective uplink path losses between cellular network equipment and a group of user equipment, and corresponding downlink path losses between the cellular network equipment and the group of user equipment, and in response to a result of applying the statistical function to the differences between the respective uplink path losses and the corresponding downlink path losses being determined to satisfy a defined difference threshold, determining, by the network equipment, that the cellular network equipment is not transmitting according to a specified power level.

In one or more example embodiments, the method can further comprise, based on the cellular network equipment being determined not to be transmitting according to the specified power level, recalibrating, by the network equipment, a transmission power level applicable to the cellular network equipment. In this regard, the statistical function applied to the differences can be an average (e.g., a mean) of the differences. Further in this regard, recalibrating the transmission power level can comprise increasing the transmission power level based on the average of the differences between the respective uplink path losses and the corresponding downlink path losses.

In one or more example embodiments, respective uplink transmissions corresponding to the uplink path losses and corresponding downlink transmissions corresponding to the downlink path losses can utilize common resource blocks.

In various embodiments, transmitter power variation can be found, for instance, by comparing the path loss as seen by the UE receiver to the path loss as seen by the base station (e.g., a gNodeB). In unpaired spectrum systems (e.g., TDD) reciprocity can be assumed, and thus path loss can be expected to be equal for uplink and downlink channels (e.g., when using the same portion of the bandwidth).

A UE can estimate path loss ($PL_{UE\_est}$), for instance, by comparing the broadcasted power (e.g., information sent in the first system information block (SIB1) in 4G and 5G) to the received power on its antenna ports:

$$PL_{UE\_est} = P_{gnb\_broadcast} - P_{UE_{Rx}} = P_{gnb_{broadcast}} - P_{gnb} + PL + e_1 \quad \text{(Equation 1)}$$

A base station can estimate the path loss ($PL_{bs\_est}$) by comparing the UE transmitted power to the received power on its antenna ports:

$$PL_{bs\_est} = P_{UE} - P_{gnb_{Rx}} = PL + e_2 \quad \text{(Equation 2)}$$

$e_1$ and $e_2$ are the errors caused by the UE for receiver or transmitter side.

Embodiments herein can detect if the desired power is transmitted:

$$P_{gnb\_broadcast} = P_{gnb} \quad \text{(Equation 3)}$$

or stated otherwise, if ΔP=0 where:

$$\Delta P = P_{gnb\_broadcast} - P_{gnb} \quad \text{(Equation 4)}$$

The case where ΔP<0 signifies that the transmitted power is lower than intended.

ΔP can be estimated by subtracting the measurements:

$$\Delta P_{est} = PL_{UE_{est}} - PL_{gnb_{est}} = P_{gnb_{broadcast}} - P_{gnb} + e_T \quad \text{(Equation 5)}$$

$$\Delta P_{est} = \Delta P + e_T$$

Where $e_T = e_1 - e_2$

To reduce the inaccuracies (e.g., error components), averaging over UEs can be performed, and over time, it can be assumed that the errors are unbiased.

$$\Delta P_{est,avg} = \sum_{i=1:N} \frac{\Delta P_{est,i}}{N} = \Delta P + \sum_{i=1:N} \frac{e_T}{N} \quad \text{(Equation 6)}$$

Next, the two path loss estimations can be derived.

UE Path Loss Estimation

The transmitted power used by the UE for the PUSCH channel is given by:

$$P_t = \min\{P_{CMAX}, P_0 + \alpha \cdot PL + 10 \cdot \log_{10}(2^{\mu} \cdot M_{RB}) + \Delta_{TF} + \delta\}, \quad \text{(Equation 7)}$$

Where:

- $P_{CMAX}$ is the maximum allowed transmit power per carrier;
- $P_0$ is the nominal power, which can be defined as the target received power per one resource block (RB) with subcarrier spacing (SCS) of 15 kHz;
- PL is the estimated path loss at the UE based on a downlink reference signal (channel state information reference signal (CSI-RS) or synchronization signal block (SSB));
- α is the fraction of path loss to be compensated (≤1), which is configured by the network;
- μ and MRB are the numerology of subcarrier spacing and the number of allocated RBs, respectively, which are used to scale the transmit power based on the allocated bandwidth;
- $\Delta_{TF}$ is a factor that is used to account for the information rate transmitted on the uplink channel; and
- δ is a term used to dynamically adjust the uplink power incrementally, by means of transmit power commands (TPCs) sent to the UE via the downlink control information (DCI).

Additionally, the UE power headroom (PHD) is transmitted periodically or via triggers. In various embodiments, the power headroom is the difference between the UE transmitted power and the max power $P_{CMAX}$. By using the power headroom indication, the transmitted power is derived:

$$P_t = P_{CMAX} - PHD \quad \text{(Equation 8)}$$

Plugged back into Equation 7:

$$P_{CMAX} - PHD = \min\{P_{CMAX}, P_0 + \alpha \cdot PL + 10 \cdot \log_{10}(2^{\mu} \cdot M_{RB}) + \Delta_{TF} + \delta\},$$

In the common case where PHD is positive, (e.g., the UE has enough power to follow the power control loop (e.g., excluding cell edge UEs)), the equation becomes:

$$P_t = \quad \text{(Equation 9)}$$

$$P_{CMAX} - PHD = P_0 + \alpha \cdot PL + 10 \cdot \log_{10}(2^{\mu} \cdot M_{RB}) + \Delta_{TF} + \delta$$

$$PL_{UE} = \frac{(P_{CMAX} - PHD) - P_0 - 10 \cdot \log_{10}(2^{\mu} \cdot M_{RB}) + \Delta_{TF} + \delta}{\alpha}$$

Since all variables on the right-hand side of Equation 9 are known at the base station side, the network (e.g., a base station such as a gNodeB comprising a system herein) can calculate the path loss seen from the UE side.

On the base station side, a physical uplink shared channel (PUSCH) transmission carrying the PHR is used to estimate the path loss.

The UE transmitted power can be determined using Equation 8 above, and by measuring the received power on the antenna port of the base station, the path loss can be determined (e.g., following Equation 2):

$$PL_{bs\_est} = P_{UE} - P_{gnb_{Rx}} = P_{CMAX} - PHD - P_{gnb_{Rx}} \quad \text{(Equation 10)}$$

It is noted that, to have the same physical path loss on the base station side as on the UE side, the PUSCH should use the same resources (RBs) as the DL channel that is used by the UE to estimate its path loss (e.g., that is normally the SSB channel or CSI-RS channel), however, this is not a requirement, as further explained herein. Therefore the L2 scheduler can add periodic allocations of PUSCH+PHR for those purposes (e.g., or use opportunistically occasions thereof). Energy measurement can be more accurate in higher SNR, and therefore only high enough SNR UEs should be used for $\Delta P_{est}$.

In FDD networks, different frequencies are allocated for uplink and downlink transmissions. As the instantaneous PL is not the same across different frequencies, embodiments herein can utilize an assumption that UL and DL path loss are the same is not guaranteed in all use cases. There are two main factors for the path loss differences across difference frequencies: (1) fast fading due to multipath; and (2) antenna gain differences due to different carrier frequency.

In the common use-case, in which UEs are scattered across the cell (e.g., and moving), fast fading will be averaged out. Additionally, gain differences are typically small, as the UL and DL carrier frequencies have a difference much smaller than 10% of the carrier frequency. Therefore, in the common use case, embodiments herein can also be utilized with FDD.

An error is defined as:

$$\Delta P_{est,avg} > TH_{high} \text{ or } \Delta P_{est,avg} < TH_{low} \quad \text{(Equation 11)}$$

in which the thresholds are as parameter for the implementation.

In the case of an error, the broadcasting of the power levels (e.g., in SIB1) can be updated to represent more accurately the actual transmitted power, scheduler processes can be adjusted; and a message to high layers or another entity can be sent, resulting in a technician fixing the Tx issues. Combining with additional information (e.g., RU reported PA levels), the problem with the RU can be more easily determined and corrected.

Additionally, or alternatively, the $\Delta P_{est,avg}$ can be sent (e.g., via a system herein), periodically, to the higher layers or another entity as raw data. In this regard, using a system herein, thresholds for sending a technician can be determined, for instance, without configuring the DU with a set of thresholds. Additionally, the raw data can be analyzed stand-alone, or in conjunction with other raw data (e.g., RU temperature), and useful correlations (e.g., Tx power drops as temperature exceeds a defined threshold) can be determined (e.g., via a system herein).

Turning now to FIG. 1, there is illustrated an example, non-limiting system 102 in accordance with one or more example embodiments herein. System 102 can comprise a computerized tool, which can be configured to perform various operations relating to distributed unit monitoring of radio unit transmitter performance. The system 102 can comprise one or more of a variety of components, such as memory 104, processor 106, bus 108, comparison component 110, and/or performance component 112. In various embodiments, one or more of the memory 104, processor 106, bus 108, comparison component 110, and/or performance component 112 can be communicatively or operably coupled (e.g., over a bus or wireless network) to one another to perform one or more functions of the system 102.

In various embodiments, the comparison component 110 can determine an average (e.g., a mean) of differences between (1) respective uplink path losses between a cellular node (e.g., base station 308) (e.g., a gNodeB) and a group of user equipment (e.g., UEs 404), and (2) corresponding downlink path losses between the cellular node (e.g., base station 308) (e.g., a gNodeB) and the group of user equipment (e.g., UEs 404). Such nonlimiting user equipment can comprise for instance, one or more of smartphones, cell phones, smartwatches, tablets, smartwatches, fitness trackers, wearable devices, or other suitable cellular-connected devices. In some embodiments, the cellular node (e.g., base station 308) can be part of a TDD cellular network. In further embodiments, the cellular node (e.g., base station 308) can be part of an FDD cellular network.

It is noted that, in various embodiments, respective uplink transmissions corresponding to the uplink path losses and corresponding downlink transmissions corresponding to the downlink path losses can utilize common resource blocks (RBs). In some embodiments, the common RBs can comprise common SSB channel(s). In further embodiments, the common RBs can comprise common CSI-RS channel(s).

In various embodiments, the performance component 112 can, in response to the average of the differences between the respective uplink path losses and the corresponding downlink path losses being determined to satisfy a defined difference threshold, determine that the cellular node (e.g., base station 308) (e.g., a gNodeB) is not transmitting according to a specified power level. Such a specified power level can be predefined or can be determined, for instance, using machine learning applied to past power levels and past path losses, other than the instant specified power level and the instant path losses.

Figure 2:
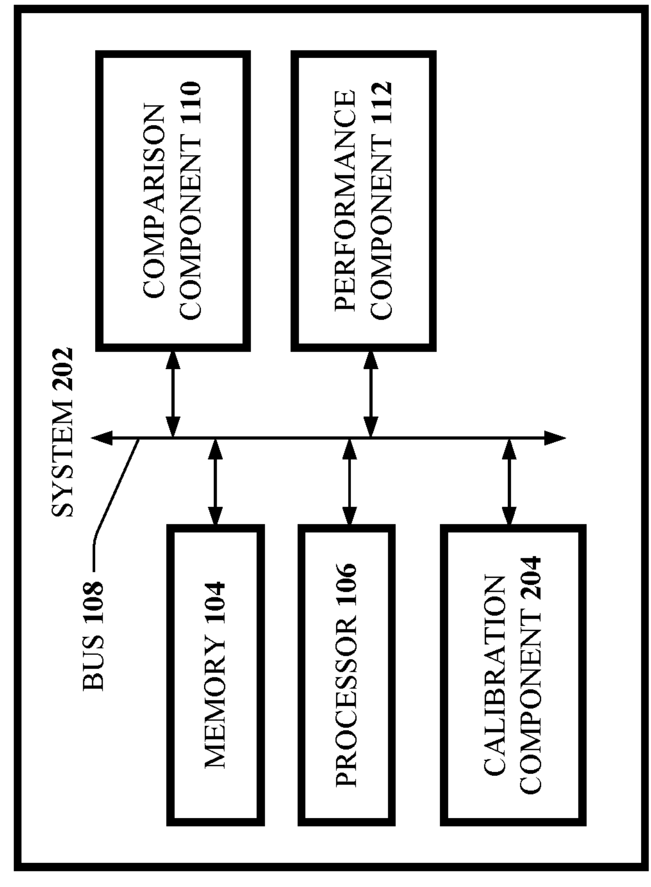
FIG. 2 is a block diagram of a non-limiting example system in accordance with one or more example embodiments described herein.

Turning now to FIG. 2, there is illustrated an example, non-limiting system 202 in accordance with one or more embodiments herein. System 202 can comprise a computerized tool, which can be configured to perform various operations relating to distributed unit monitoring of radio unit transmitter performance. The system 202 can be similar to system 102, and can comprise one or more of a variety of components, such as memory 104, processor 106, bus 108, comparison component 110 and/or performance component 112. The system 202 can further comprise a calibration component 204. In various embodiments, one or more of the memory 104, processor 106, bus 108, comparison component 110, performance component 112, and/or calibration component 204 can be communicatively or operably coupled (e.g., over a bus or wireless network) to one another to perform one or more functions of the system 202.

In various embodiments, the calibration component 204 can, in response to the determining (e.g., via the performance component 112) that the cellular node (e.g., base station 308) (e.g., a gNodeB) is not transmitting according to the specified power level, recalibrate a transmission power level applicable to the cellular node (e.g., base station 308). In this regard, recalibrating (e.g., via the calibration component 204) the transmission power level can comprise adjusting (e.g., via the calibration component 204) the transmission power level based on the average of the differences between the respective uplink path losses and the corresponding downlink path losses. In this regard, the cellular node can be recalibrated to actually transmit according to the specified power level.

Figure 3:
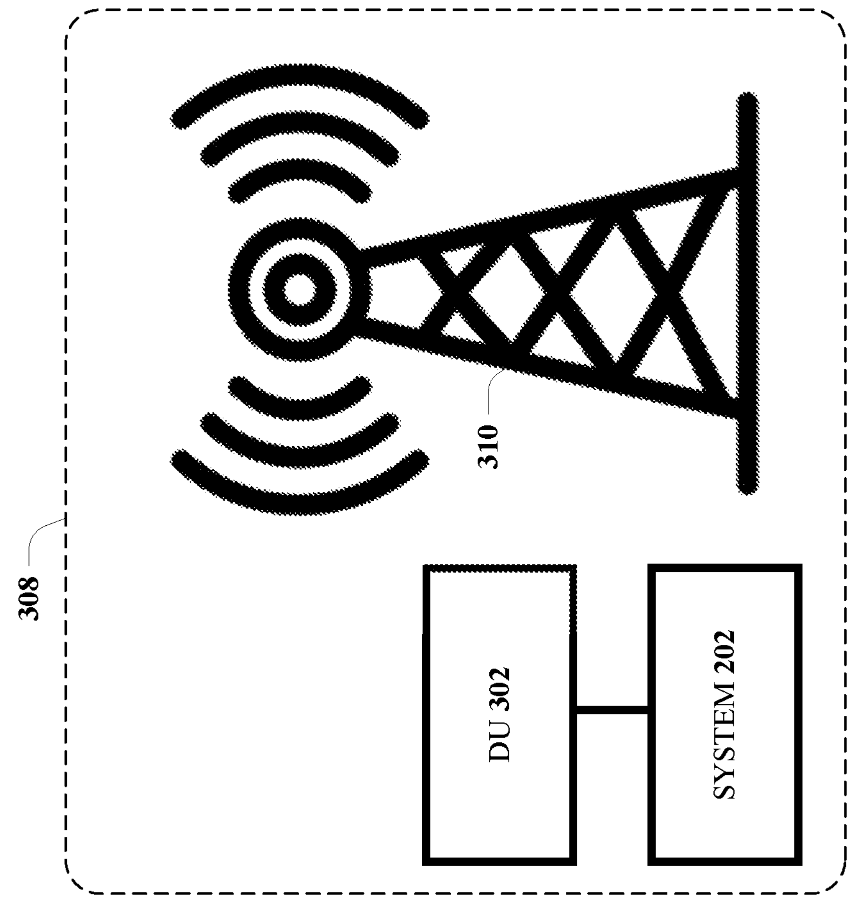
FIG. 3 is a block diagram of a non-limiting example base station in accordance with one or more example embodiments described herein.
Figure 4:
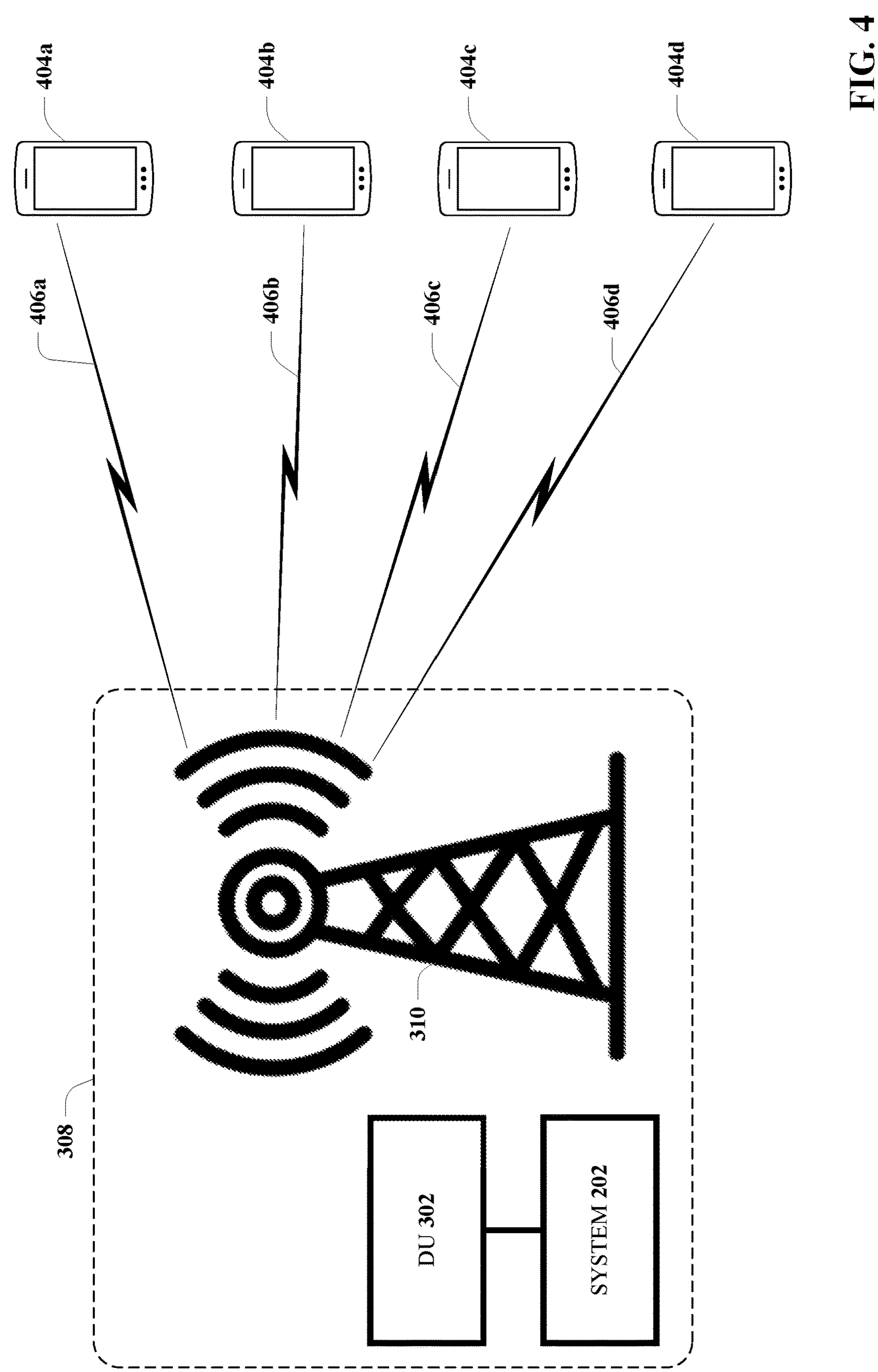
FIG. 4 is a block diagram of a non-limiting example base station in accordance with one or more example embodiments described herein.

FIGS. 3 and 4 illustrate a block diagram of a non-limiting example base station 308 in accordance with one or more example embodiments described herein. In various embodiments, the base station 308 (e.g., a gNodeB) (e.g., a cellular node) can comprise and/or be communicatively coupled to a DU 302, RU 310, system 102, and/or system 202. In various embodiments, the base station 308 can be communicatively coupled to one or more UEs 404 via respective cellular connections. For instance, the base station 308 can be communicatively coupled to the UE 404*a* via the cellular connection 406*a*. Similarly, the base station 308 can be communicatively coupled to the UE 404*b* via the cellular connection 406*b*, the base station 308 can be communicatively coupled to the UE 404*c* via the cellular connection 406*c*, and the base station 308 can be communicatively coupled to the UE 404*d* via the cellular connection 406*d*. In various embodiments, the DU 302 can comprise and/or be communicatively coupled to the system 102 or 202.

FIG. 5 is a flowchart for a process 500 associated with distributed unit monitoring of radio unit transmitter performance in accordance with one or more example embodiments described herein. At 502, the comparison component 110 can determine uplink path losses (e.g., between a cellular node, such as a base station 308, and a group of user equipment (e.g., UEs 404)). At 504, the comparison component 110 can determine downlink path losses (e.g., between the cellular node, such as the base station 308, and the group of user equipment (e.g., UEs 404). At 506, the comparison component 110 can determine an average (e.g., a mean) of differences between the aforementioned uplink path losses and the downlink path losses. At 508, the performance component 112 can determine whether the average (e.g., mean) of the differences between the respective uplink path losses and the corresponding downlink path losses satisfies a defined difference threshold. If the average (e.g., mean) of the differences between the respective uplink path losses and the corresponding downlink path losses satisfies a defined difference threshold (e.g., YES at 508), the process can proceed to 510. If the average (e.g., mean) of the differences between the respective uplink path losses and the corresponding downlink path losses does not satisfy a defined difference threshold (e.g., NO at 508), the process can proceed to 512. At 510, the performance component 112 can determine that the cellular node (e.g., base station 308) (e.g., a gNodeB) is not transmitting according to a specified power level. At 512, the performance component 112 can determine that the cellular node (e.g., base station 308) (e.g., a gNodeB) is transmitting according to the specified power level. At 514, the calibration component 204 can, in response to the determining (e.g., via the performance component 112) that the cellular node (e.g., base station 308) (e.g., a gNodeB) is not transmitting according to the specified power level, recalibrate a transmission power level applicable to the cellular node (e.g., base station 308) (e.g., a gNodeB) to be within threshold conformity with the specified power level.

Figure 6:
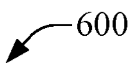
FIG. 6 is a block flow diagram for a process associated with distributed unit monitoring of radio unit transmitter performance in accordance with one or more example embodiments described herein.

FIG. 6 illustrates a block flow diagram for a process 600 associated with distributed unit monitoring of radio unit transmitter performance in accordance with one or more embodiments described herein. At 602, the process 600 can comprise determining (e.g., via the comparison component 110) an average of differences between respective uplink path losses between a cellular node (e.g., base station 308) and a group of user equipment (e.g., UEs 404), and corresponding downlink path losses between the cellular node (e.g., base station 308) and the group of user equipment (e.g., UEs 404). At 604, the process 600 can comprise, in response to the average of the differences between the respective uplink path losses and the corresponding downlink path losses being determined to satisfy a defined difference threshold, determining (e.g., via the performance component 112) that the cellular node (e.g., base station 308) is not transmitting according to a specified power level.

FIG. 7 illustrates a block flow diagram for a process 700 associated with distributed unit monitoring of radio unit transmitter performance in accordance with one or more embodiments described herein. At 702, the process 700 can comprise determining (e.g., via the comparison component 110) a mean of differences between respective uplink path losses between network equipment (e.g., base station 308) and a group of user equipment (e.g., UEs 404), and corresponding downlink path losses between the network equipment (e.g., base station 308) and the group of user equipment (e.g., UEs 404). At 704, the process 700 can comprise, in response to the mean of the differences between the respective uplink path losses and the corresponding downlink path losses being determined to satisfy a defined difference criterion, determining (e.g., via the performance component 112) that the network equipment (e.g., base station 308) is not transmitting according to a defined power level.

FIG. 8 illustrates a block flow diagram for a process 800 associated with distributed unit monitoring of radio unit transmitter performance in accordance with one or more embodiments described herein. At 802, the process 800 can comprise determining (e.g., via the comparison component 110), by network equipment comprising a processor, a statistical function applied to differences between respective uplink path losses between cellular network equipment (e.g., base station 308) and a group of user equipment (e.g., UEs 404), and corresponding downlink path losses between the cellular network equipment (e.g., base station 308) and the group of user equipment (e.g., UEs 404). At 804, the process 800 can comprise, in response to a result of applying the statistical function to the differences between the respective uplink path losses and the corresponding downlink path losses being determined to satisfy a defined difference threshold, determining (e.g., via the performance component 112), by the network equipment, that the cellular network equipment (e.g., base station 308) is not transmitting according to a specified power level.

Figure 9:
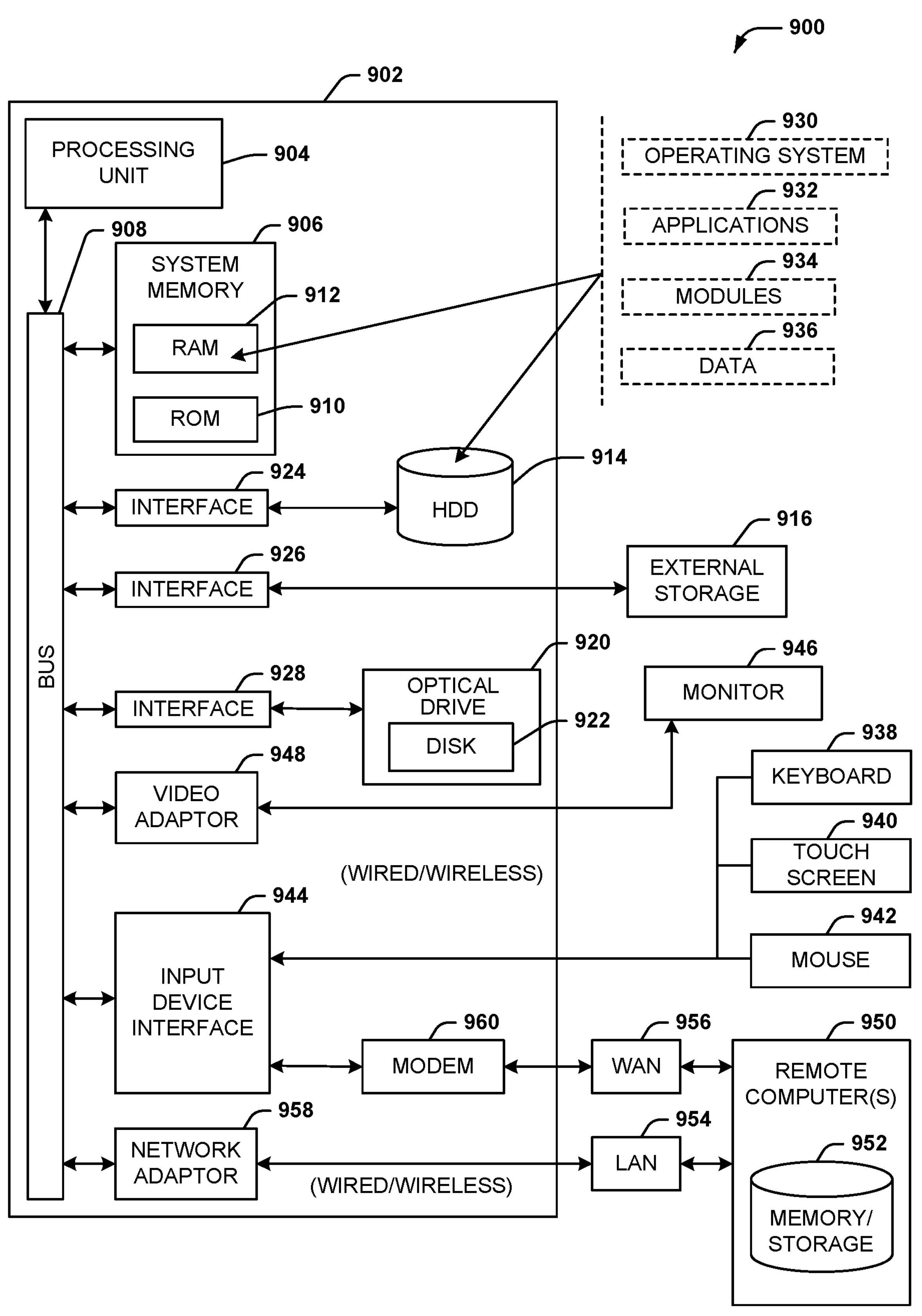
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (ΔP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
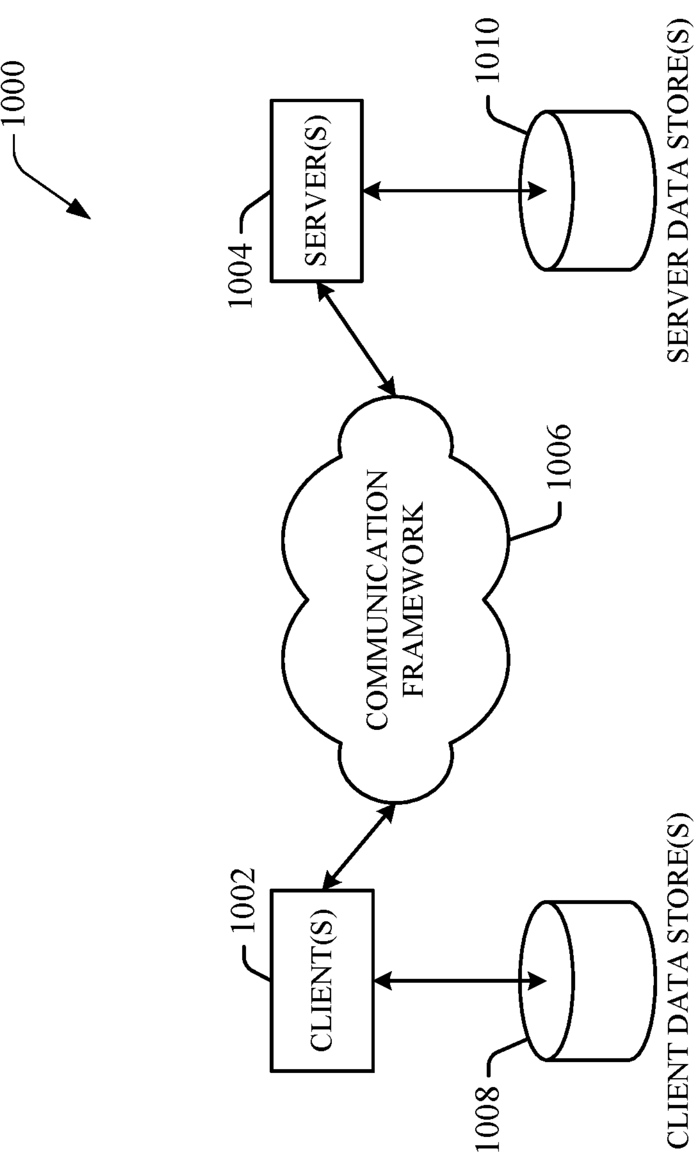
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms “exemplary” and/or “demonstrative” as used herein are intended to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent structures and techniques known to one skilled in the art. Furthermore, to the extent that the terms “includes,” “has,” “contains,” and other similar words are used in either the detailed description or the claims, such terms are intended to be inclusive—in a manner similar to the term “comprising” as an open transition word—without precluding any additional or other elements.

The term “or” as used herein is intended to mean an inclusive “or” rather than an exclusive “or.” For example, the phrase “A or B” is intended to include instances of A, B, and both A and B. Additionally, the articles “a” and “an” as used in this application and the appended claims should generally be construed to mean “one or more” unless either otherwise specified or clear from the context to be directed to a singular form.

The term “set” as employed herein excludes the empty set, i.e., the set with no elements therein. Thus, a “set” in the subject disclosure includes one or more elements or entities. Likewise, the term “group” as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

determining an average of differences between respective uplink path losses between a cellular node and a group of user equipment, and corresponding downlink path losses between the cellular node and the group of user equipment; and in response to the average of the differences between the respective uplink path losses and the corresponding downlink path losses being determined to satisfy a defined difference threshold, determining that the cellular node is not transmitting according to a specified power level.

2. The system of claim 1, wherein the operations further comprise:

in response to the determining that the cellular node is not transmitting according to the specified power level, recalibrating a transmission power level applicable to the cellular node.

3. The system of claim 2, wherein recalibrating the transmission power level comprises adjusting the transmission power level based on the average of the differences between the respective uplink path losses and the corresponding downlink path losses.

4. The system of claim 1, wherein the cellular node is part of a time division duplexing cellular network.

5. The system of claim 1, wherein the cellular node is part of a frequency division duplexing cellular network.

6. The system of claim 1, wherein respective uplink transmissions corresponding to the uplink path losses and corresponding downlink transmissions corresponding to the downlink path losses utilize common resource blocks.

7. The system of claim 6, wherein the common resource blocks comprise common synchronization signal block channels.

8. The system of claim 6, wherein the common resource blocks comprise common channel state information reference signal channels.

9. A non-transitory machine-readable medium, comprising executable instructions that, when executed by at least one processor, facilitate performance of operations, comprising:

determining a mean of differences between respective uplink path losses between network equipment and a group of user equipment, and corresponding downlink path losses between the network equipment and the group of user equipment; and in response to the mean of the differences between the respective uplink path losses and the corresponding downlink path losses being determined to satisfy a defined difference criterion, determining that the network equipment is not transmitting according to a defined power level.

10. The non-transitory machine-readable medium of claim 9, wherein the operations further comprise:

in response to the determining that the network equipment is not transmitting according to the defined power level, recalibrating a transmission power level applicable to the network equipment.

11. The non-transitory machine-readable medium of claim 10, wherein recalibrating the transmission power level comprises adjusting the transmission power level based on the mean of the differences between the respective uplink path losses and the corresponding downlink path losses.

12. The non-transitory machine-readable medium of claim 9, wherein the network equipment is part of a time division duplexing cellular network.

13. The non-transitory machine-readable medium of claim 9, wherein the network equipment is part of a frequency division duplexing cellular network.

14. The non-transitory machine-readable medium of claim 9, wherein at least one of respective uplink transmissions corresponding to the uplink path losses or corresponding downlink transmissions corresponding to the downlink path losses utilize common resource blocks.

15. The non-transitory machine-readable medium of claim 14, wherein the common resource blocks comprise a common synchronization signal block channel.

16. The non-transitory machine-readable medium of claim 14, wherein the common resource blocks comprise a common channel state information reference signal channel.

17. A method, comprising:

determining, by network equipment comprising at least one processor, a statistical function applied to differences between respective uplink path losses between cellular network equipment and a group of user equipment, and corresponding downlink path losses between the cellular network equipment and the group of user equipment;

in response to a result of applying the statistical function to the differences between the respective uplink path losses and the corresponding downlink path losses being determined to satisfy a defined difference threshold, determining, by the network equipment, that the cellular network equipment is not transmitting according to a specified power level, based on the cellular network equipment being determined not to be transmitting according to the specified power level, recalibrating, by the network equipment, a transmission power level applicable to the cellular network equipment, wherein the statistical function applied to the differences is an average of the differences, and wherein recalibrating the transmission power level comprises increasing the transmission power level based on the average of the differences between the respective uplink path losses and the corresponding downlink path losses.

18. The method of claim 17, wherein respective uplink transmissions corresponding to the uplink path losses and corresponding downlink transmissions corresponding to the downlink path losses utilize common resource blocks.

19. The method of claim 17, wherein the cellular network equipment is part of a time division duplexing cellular network.

20. The method of claim 17, wherein the cellular network equipment is part of a frequency division duplexing cellular network.

* * * * *